United States Patent [19]

Mendoza et al.

[11] Patent Number: 4,869,817

[45] Date of Patent: Sep. 26, 1989

[54] BACKWASH VALVE LEVER CONTROL SYSTEM

[75] Inventors: Joe Mendoza, Garden Grove; Joseph Han, Glendora, both of Calif.

[73] Assignee: Hydrotech Chemical Corporation, West Lafayette, Ind.

[21] Appl. No.: 560,233

[22] Filed: Dec. 12, 1983

Related U.S. Application Data

[63] Continuation of Ser. No. 365,639, Apr. 5, 1982, abandoned.

[51] Int. Cl.⁴ ............................................. B01D 29/36
[52] U.S. Cl. ................................ 210/169; 137/625.29;
                                210/278; 210/426; 210/429
[58] Field of Search ............... 210/169, 237, 238, 240,
             210/245, 278, 279, 288, 411, 425, 426, 429;
                                                137/625.29

[56] References Cited

U.S. PATENT DOCUMENTS

| | | | |
|---|---|---|---|
| 3,316,937 | 5/1967 | Friedman et al. | 137/625.29 |
| 3,451,554 | 6/1969 | Wade | 210/278 |
| 3,640,310 | 2/1972 | Erlich | 137/625.46 |
| 3,707,233 | 12/1972 | Lerner | 210/278 |
| 3,809,247 | 5/1974 | Brett | 210/278 |
| 4,216,798 | 8/1980 | Tscherner | 137/625.29 |

*Primary Examiner*—Richard V. Fisher
*Attorney, Agent, or Firm*—Kirkland & Ellis

[57] ABSTRACT

A valve structure for a swimming pool water filter includes:
  (a) a hollow body having multiple flow apertures,
  (b) a rotary plate on the body and having flow porting, the plate being movable toward and away from said flow apertures,
  (c) seal means between the body and plate,
  (d) a handle having operative connection to the plate to rotate said plate to bring said plate porting into and out of selected registration with said flow apertures,
  (e) and means mounting the handle to pivot without rotating the plate, and between a first position in which the handle has moved the plate to energize the seal means to seal off between the body and plate, and a second position in which the handle has moved the plate to de-energized said seal means.

10 Claims, 4 Drawing Sheets

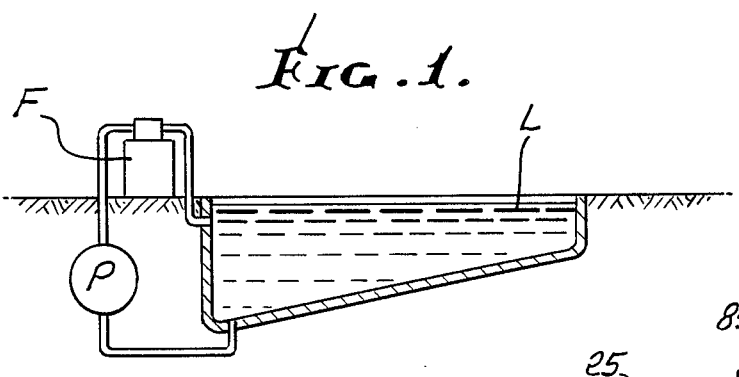
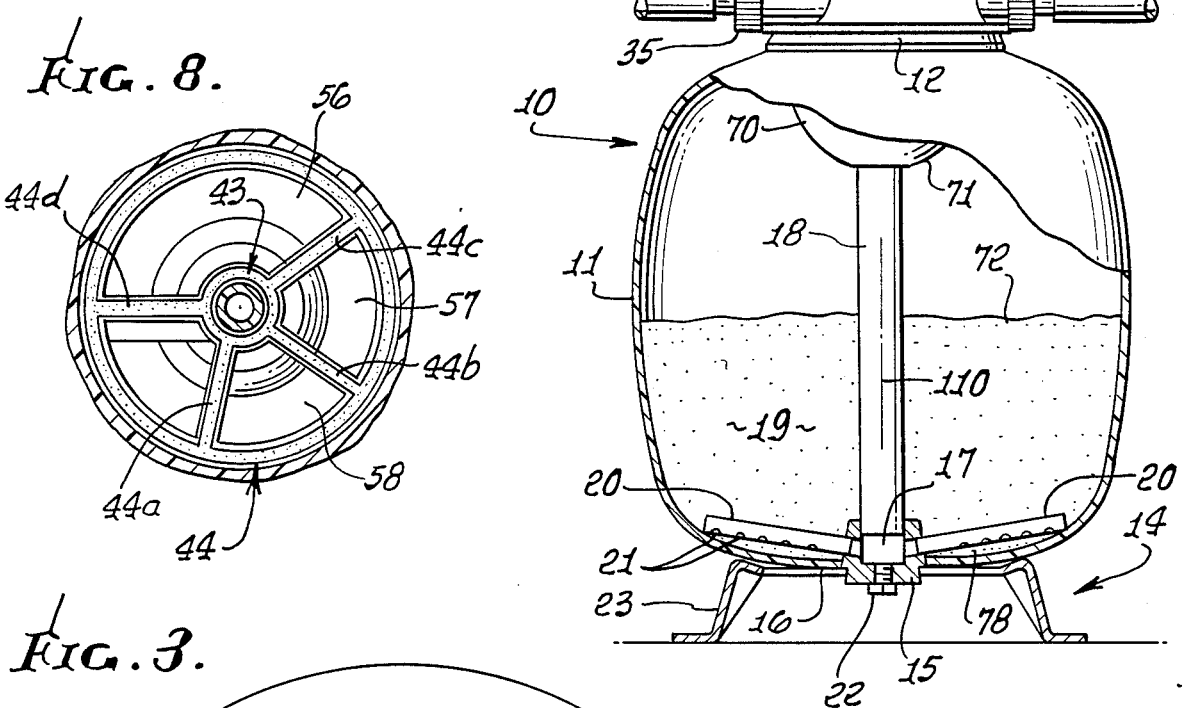
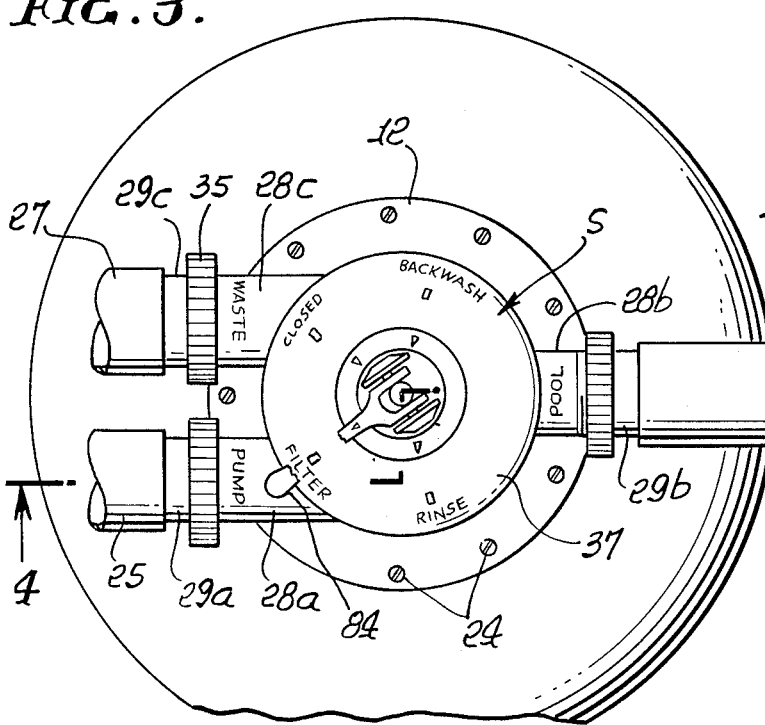

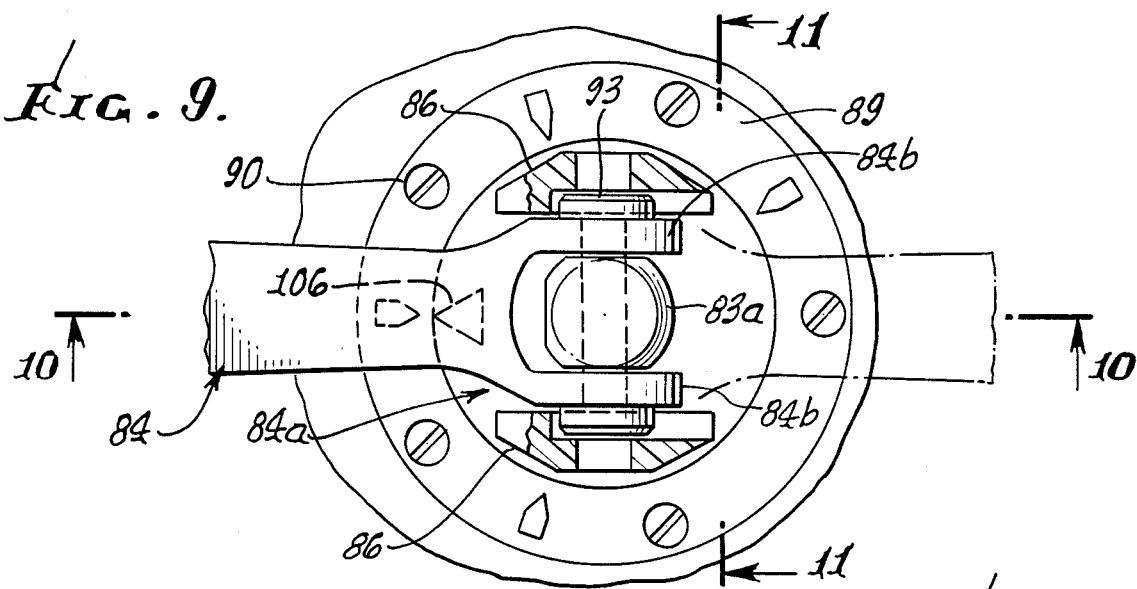
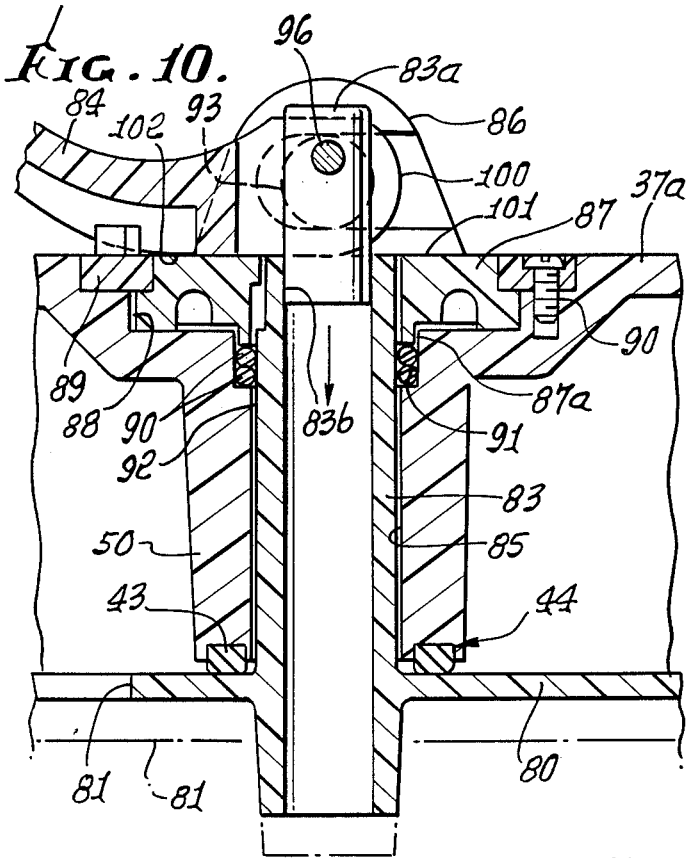
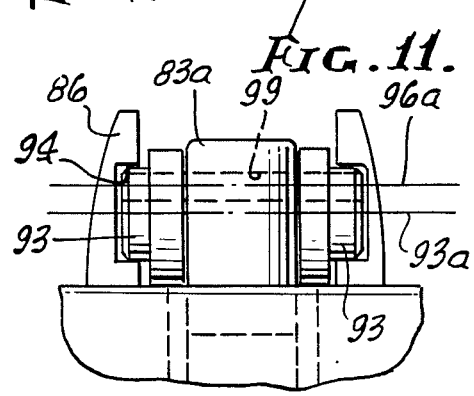
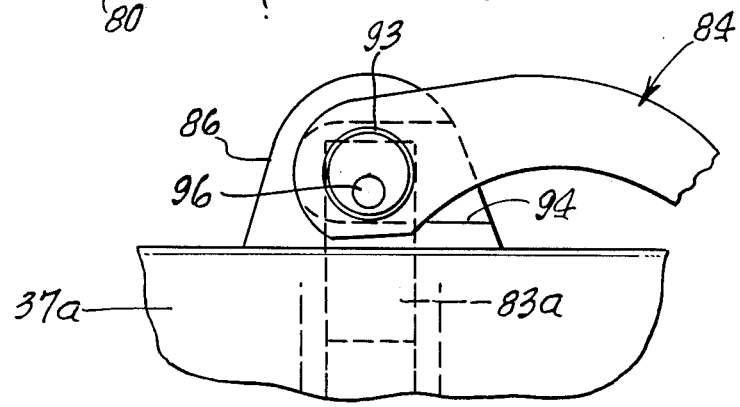

BACKWASH VALVE LEVER CONTROL SYSTEM

BACKGROUND OF THE INVENTION

This application is a continuation of Ser. No. 365,639 filed Apr. 5, 1982, now abandoned.

The invention has to do with filter devices for filtration of swimming pool water, and more particularly with swimming pool water filters having a multi mode operational capability, and valve structure of improved design for achieving such capability with low maintenance requirements and high reliability over years of service.

PRIOR ART

Swimming pool filters of the packed bed type in which sand or like filtering medium is used, require periodic backwashing as the filter bed becomes clogged and pressure drops across the bed accordingly become excessive. Such filters are cleaned by reverse flushing with water, the debris being discharged to waste. Formerly the filter was then reconnected in the filtration mode but this often passes debris left in the backwash water in the filter into the pool. (See U.S. Pat. No. 3,451,554 to Wade). More recently a third mode of operation has been provided in such filters, termed a rinse mode; in this mode the water flows through the bed as in normal filtration, but the filtrate is passed to waste until clear, thereafter the filtrate is passed to the pool. See U.S. Pat. No. 3,640,310 to Erlich.

The valve structure by means of which operating modes are selected is the critical feature of such filters. Ideally the valve structure will be well sealed, durable, easily operated, not unduly high in pressure drop and low in cost.

SUMMARY OF THE INVENTION

The present valve structure meet these criteria to a greater degree than previously available and improves over the valve structure of U.S. Pat. No. 3,809,247.

Basically, the invention is embodied in valve structure comprising.

(a) a hollow body having multiple flow apertures, (b) a rotary plate on the body and having flow porting, the plate being movable toward and away from said flow apertures, (c) seal means between the body and plate, (d) a handle having operative connection to the plate to rotate said plate to bring said plate porting into and out of selected registration with said flow apertures, (e) and means mounting the handle to pivot without rotating the plate, and between a first position in which the handle has moved the plate to energize the seal means to seal off between the body and plate, and a second position in which the handle has moved the plate to de-energize said seal means.

As will be seen, the handle mounting means provides a positive and reliable handle action for effecting both valve shifting to selected position and locking of the valve in selected position. Said means includes a handle connection to said body defining a handle pivot axis, and a handle connection to the plate defining a second axis, said pivot axis and said second axis being eccentrically located relative to one another. Further, the handle connection to the plate may include a shaft projecting from the plate normal to said second axis, and a fastener interconnecting the shaft and handle and defining said second axis.

In addition, the handle connection to the body may include a forked handle portion defining flanges, and trunnions on the flanges received in bearing recesses in mounting structure on the body; and the handle advantageously has a cam surface to engage the body in said first handle position to frictionally lock the handle in said position.

More specifically, the plate typically has two of the flow ports variably registrable with four of said body flow apertures, and said seal means includes inner and outer rings and spokes interconnecting the rings to define bounded regions respectively in registration with said four apertures, said ports located at one side of said seal means, and said apertures located at the opposite side of said seal ring.

These and other objects and advantages of the invention, as well as the details of an illustrative embodiment, will be more fully understood from the following specification and drawings, in which:

DRAWING DESCRIPTION

FIG. 1 is a diagrammatic view of a typical swimming pool installation;

FIG. 2 is a side elevational view, partly in section, showing filter and valve structure;

FIG. 3 is a top plan view of the filter vessel, valve structure, and associated flow lines;

FIG. 8 is a section taken on lines 8—8 of FIG. 4, showing the valve seal in plan;

FIG. 9 is a plan view of the valve handle and associated structure in the locked position of FIG. 4;

FIG. 10 is an enlarged section taken in elevation on lines 10—10 of FIG. 9;

FIG. 11 is an enlarged section taken in section on lines 11—11 of FIG. 9; and

FIG. 12 is a fragmentary section like FIG. 10, but showing the valve handle in unlocked position.

DETAILED DESCRIPTION

Figure 4:
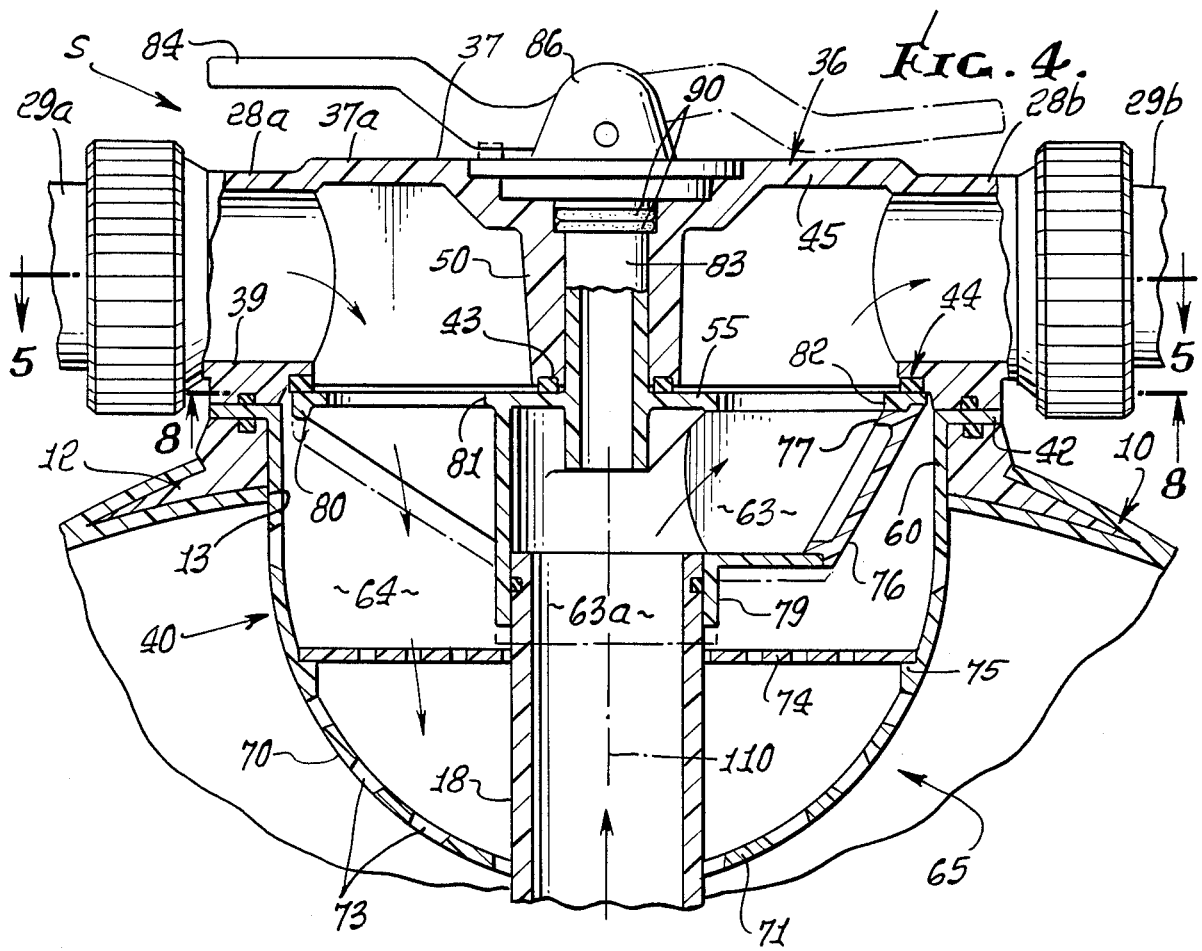
FIG. 4 is a view in vertical section taken on lines 4—4 of FIG. 3, with valve handle in locked position.

With reference now to the drawings, in FIG. 1 a typical swimming pool installation is depicted in which pool water from pool L is circulated by pump P to and from the pool through filter F. Filter F is shown in FIGS. 2 to 4 to comprise a filter vessel 10 which may be formed of sheet metal, or molded plastic or preferably of wound fiberglass walls 11 with a thermosetting resin impregnant, desirably with a valve structure mounting ring 12 embedded in the resin/filter system at the topmost opening 13 in the vessel, see FIG. 4. A bottom or base 14 structure includes a lower fitting 15 extending through the vessel bottom wall portion 16 embedded in the resin and fiber glass. The fitting 15 provides a manifold chamber 17 within the vessel into which is fitted the lower end of pipe 18 extending axially within the vessel through filter medium 19, and from which projects plural radially disposed collectors 20, being tubular members having downwardly directed openings 21 for collection of water. A threaded drain plug 22 is screwed into the filter 15 and pedestal 23 is secured to the fitting to support the vessel 10 above the ground.

The valve structure S is secured to the mounting ring 12 by a series of fasteners 24 as shown in FIG. 3. The valve structure S interconnects an incoming line 25 providing water under pressure from the pump P, an outlet line 26 which is the return line to the pool L and a waste discharge line 27 used to dispose of backwash and rinse water. Which pair of lines is interconnected is a function of the valve position selected.

Referring now to FIG. 3, incoming line 25 is shown at the left, and outlet line 26, the return to pool L, is shown at the right. The lines 25, 26 and 27 are connected to the valve structure S to be readily disconnected without the extensive plumbing work normally encountered in servicing filter devices. For this purpose, the valve structure S is provided with outwardly horizontally projecting exteriorly threaded tubular stubs 28a, 28b and 28c of a large size, e.g. 2 inches in diameter, approximating the largest size pipe to be encountered in normal installation. Tubular adapters 29a, 29b and 29c are provided sized at inner ends 30 to abut the corresponding stubs and at outer ends 31 to interfit with lines 25, 26 or 27; conveniently the tubular adapters can be of two different diameters along their lengths, i.e. 1 ½ and 2 inches in diameter, and the smaller diameter portion cut off if not needed, as in the installation depicted in FIG. 4. Spaced from the adapted inner end 30, an annular rib 32 is provided to which O-ring seal 33 is abutted. An internally threaded adapter nut 35 having an inward flange 36' is butted against rib 32. The adapters ar solvent welded to line 25, 26 or 27, and each adapter nut 35 threaded onto thread 34 bringing the adapter up snug against the stub and compressing O-ring 33 between the sleeve and rib 32, to effect a water tight but easily disconnected seal.

Again with reference to FIG. 4, and FIGS. 5–7, the valve structure comprises a hollow body 36 having aligned upper section 37 with bottom wall 55 defining a flange 39 and lower section 40 with outward flange 42, secured to the upper section as by screws. The upper and lower sections are axially aligned and co-axial with the vessel 10 longitudinal axis 110. The upper section 37 comprises a housing 37a that includes an upper horizontal wall 45 and a cylindrical side wall 46 having vertically disposed openings 47, 48 and 49 respectively for incoming line 25, outlet line 26 and waste line 27. Centrally of the housing 37a a post 50 is provided for purposes to appear. Extending radially outward from the post 50 are interior walls 52, 53, and 54 within the housing 37a which together with the top, side and bottom walls 45, 46 and 55 respectively, form three separate chambers within the housing; namely, an inlet port chamber 56 communicating with incoming line 47; outlet port chamber 57 communicating with outlet opening 48; and waste discharge port chamber 58 communicating with waste discharge opening 49. Note also flow guide wall 52a. Seals 43 and 44 are provided on walls 52, 53 and 54 and about each chamber 56, 57 and 58. The chambers open downwardly, to define flow apertures, controlled by valve plate 80 to be described.

The valve structure lower section 40 includes wall structure 60 that defines an upper circular chamber 64 and further defines therebelow water distribution means, indicated at 65, of considerable advantage. Referring to FIG. 4, there is shown an axially elongated, downwardly convergent highly perforate shell 70 extending coaxially of and within the filter vessel 10 and lower valve section 40, the lower terminus 71 of said shell being spaced above the upper portion 72 of the filtering medium 19. (FIG. 2). Thus arranged, water from the inlet chamber 56 passes through the shell perforations 73, the perforations being a multiplicity of individual orifices downwardly extending and variously radially directed outward toward the filter medium 19 below. The described perforate distributor 70 has been found to provide laminar currents within the water filling the vessel 10, and thereby reduce turbulence in the topmost portion 72 of the filtering medium e.g. sand and thus to prevent cratering, channeling and premature failure of the sand bed despite high throughput rates. Conventional single or multiple nozzle arrangements do not have laminar flow, or otherwise tend to make the top of a sand bed uneven, unlike the described arrangement. A transverse annular perforate diffusion plate 74 supported by internal shoulder 75 of the shell 70 can be provided to break up incoming water streams, about the medium level of the shell 70.

The lower section 40 further contains means forming the separate water passage 63 within the wall structure 60 in the form of an essentially elbow configuration 76 extending axially of the lower section and thence radially outward to the valve periphery 77 to deliver water to and from the lower portion 78 of the filter medium 19. The elbow configuration 76 includes a downwardly open tubular boss 79 adapted to engage the pipe 18 extending upwardly from the lower portion of the filter medium, which thus defines a continuation 63a of the water passage 63.

The elbow configuration 76 is carried by and below the valve plate 80 with which it is preferably integrally formed. Valve plate 80 is a disc having first and second circularly spaced valve openings 81, 82 formed therein, in a common plate, parallel to the upper section port plane above described. The first and second valve openings 81, 82 are arranged to selectively communicate with chambers 56, 57 and 58 by rotation of the valve plate 80.

Referring to FIGS. 4 and 9–12, the valve plate 80 is carried on or integral with valve operating shaft 83, which extends upwardly from the plate and through bore 85 in post 50. An upper extension 83a of the shaft projects centrally upwardly from the shaft interior at 83b, above the top level of housing 37a, and between two pillow blocks 86. The latter are carried by a horizontal plate 87 received in housing top recess 88. A retainer ring 89 and fastener 90 hold plate 87 in position, as shown. Plate lip 87a retains seal rings 90 in position between non-rotary counterbore 91 in post 50, and the outer surface 92 of rotary shaft 83.

A valve handle 84 serves not only to rotate the valve plate 80 via shaft 83, but also to raise and lower that plate into and out of sealing engagement with seals 43 or gasket 44 (which includes inner and outer seal rings 43 and 43a, as well as spoke seals 44a–44e (see FIG. 8). To this end, the handle 84 is forked at 84a to provide two flanges 84b at opposite sides of the post extention 83a. Trunnion 93 on the handle flanges are received in bearing recesses 94 in the pillow blocks, as shown in FIG. 11, to accommodate handle pivoting between "locked" position of FIG. 10 (with plate 80 raised to sealingly engage the gasket 44), and "unlocked" position of FIG. 12, with plate 80 lowered out of engagement with the gasket. In being shifted between FIGS. 10 and 11 position, the handle is pivoted about 180°.

A pin 96 is also carried by the flanges 84b, and eccentrically relative to the trunnions; i.e. the pin axis 96a is offset from the trunnion axis 93a, as seen in FIG. 11. The pin also passes through a bore 99 in the handle extension 83a. In "locked" position, pin axis 96a is above trunnion axis 93a, whereas in unlocked position, pin axis 96a is below the trunnion axis.

Note further that the handle flange edges are curved or rounded at 100 so as to have load bearing or camming engagement with the top surface 101 of the plate 87, characterized in that as the handle is pivoted counter-clockwise into final "locked" position. In FIG. 10, the trunnions 93 are slightly elevated to frictionally tightly engage the pillow blocks, locking the handle in "over center" position; also the pin 96 is correspondingly slightly elevated to increase the sealing force of engagement of plate 80 with gasket 44. Flat surface 102 of the handle engages the plate 87 at this time.

The shaft 83 is reciprocable and rotatable as thus mounted and thereby the valve plate 80 and water passage elbow configuration 76 are shiftable axially downward, (see the phantom lines), and rotatable into different operating positions, to be described. The engagement between the elbow configuration tubular boss 79 and pipe 18, noted above, is accordingly such as to permit both rotational and sliding movement to accommodate integral axial shifting and rotation of the lower section 40 and valve plate 80. Spacing of valve plate 80 from seals 43 during adjustment saves wear on these seals. The axial shiftability of the valve plate enables positive sealing force at the seals 43 during operation responsive to water pressure on surfaces 90 and 91.

The valve plate 80, it will be observed is on the underside, or pressure side, of the valve body 36, in constant pressure communication with the water which fills the vessel 10 during operation of the filter, whereby a positive seal is realized, sealing of the valve plate 80 against seals 43 being assisted by internal water pressure in the vessel 10.

Figure 5:
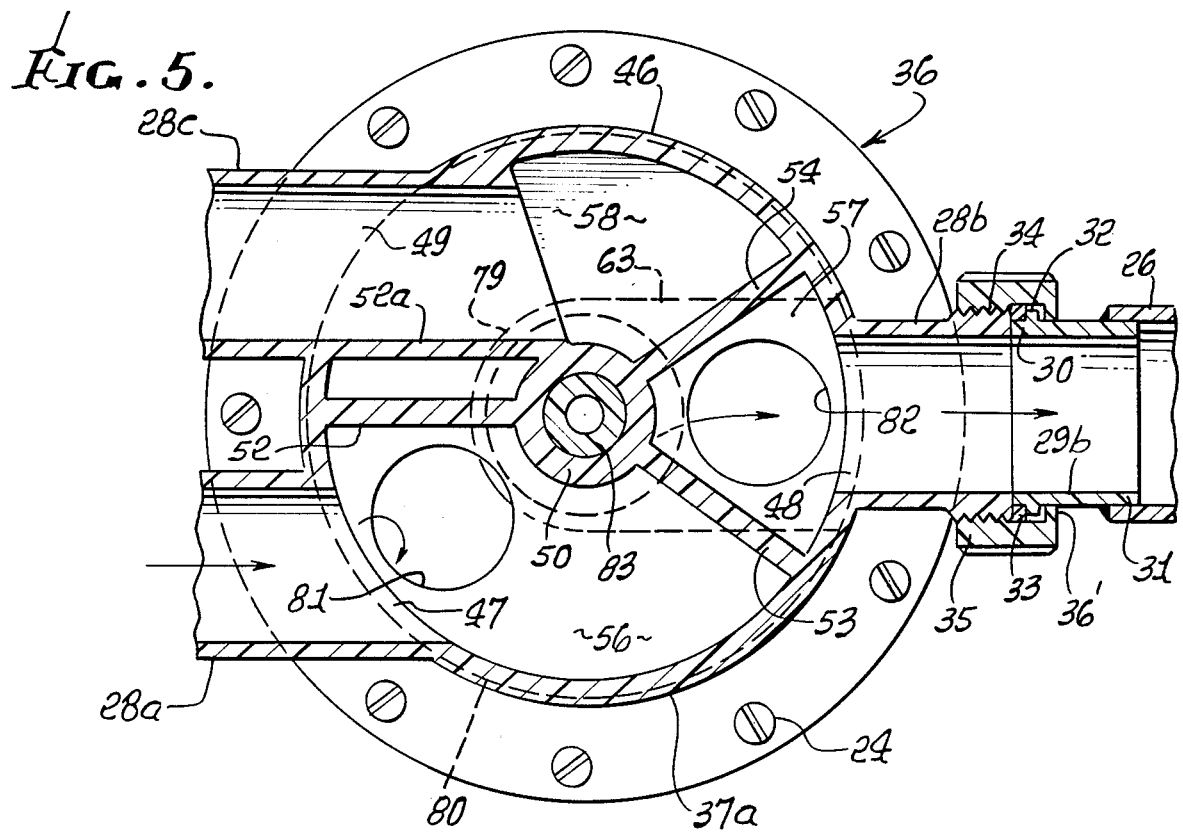
FIG. 5 is a horizontal cross sectional view of the valve upper section taken on lines 5—5 of FIG. 4, and showing filter mode.

In operation, and assuming the filtering mode is first selected, the handle arrow 106 is turned toward "filter" and the inlet port 1 is registered with the first valve plate opening 81, as shown in FIGS. 4, 5, and 8. Water from incoming line 25 enters chamber 56, is passed directly without substantial restriction through first opening 81 and thence through the diffusion plate 74 and distributor 70 onto and through the filter medium 19, whence the water is collected by collectors 20 and passed through manifold chamber 17 upward through pipe 18 through elbow configuration 76 and out valve second opening 82, outlet chamber 57, opening 48 and outlet line 26. This is the normal filter operation.

Figure 6:
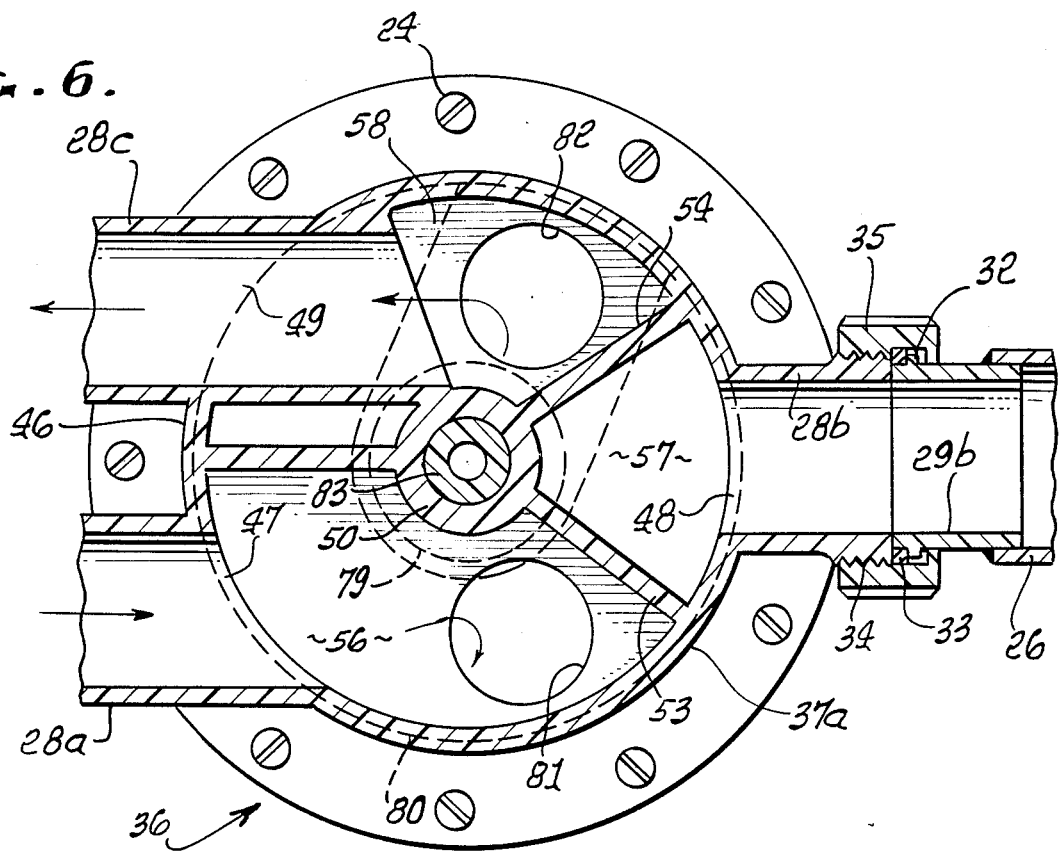
FIG. 6 is a view like FIG. 5 but showing the rinse mode.
Figure 7:
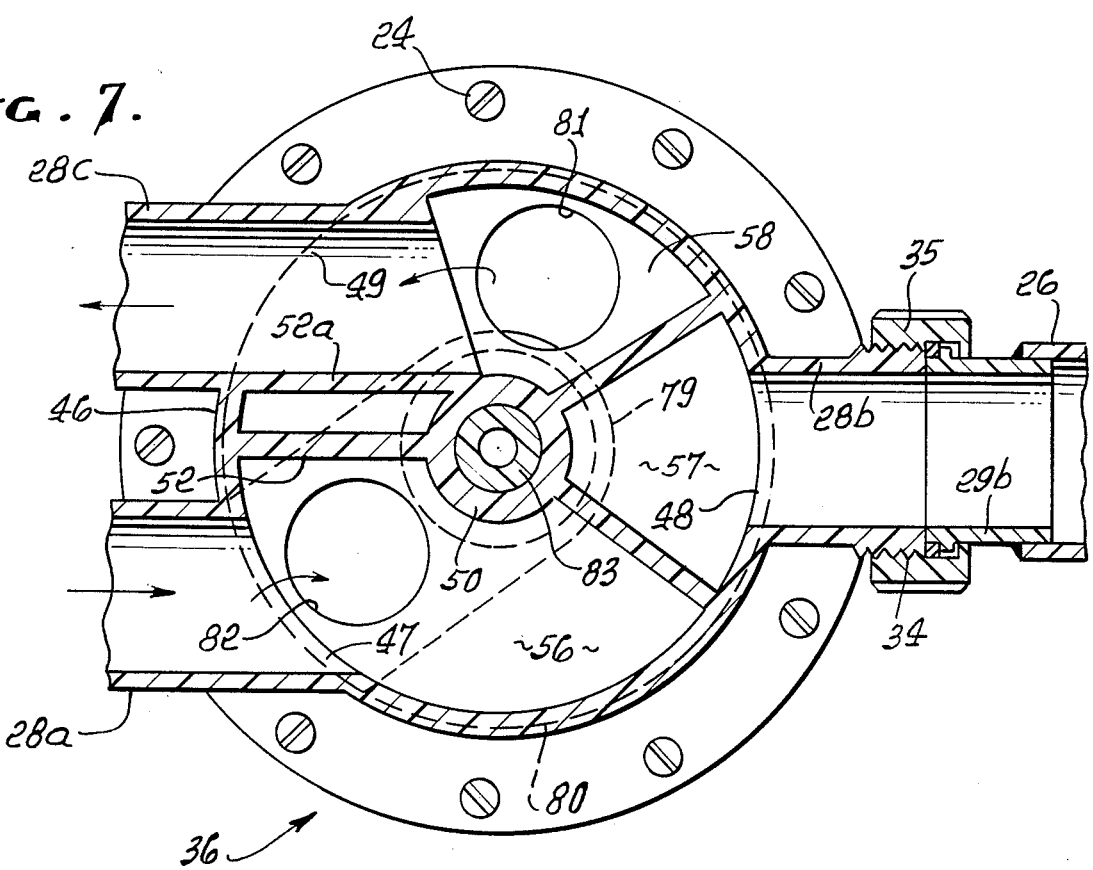
FIG. 7 is a view like FIG. 5 but showing the backwash mode.

For backwash, the handle 84 is pivoted to unlocked (FIG. 12) position, and then rotated until the arrow 106 is registered with "backwash" the lower section 40 and valve plate 80 being rotated to the position shown in FIG. 7. As will be evident, incoming pressurized water is directed down pipe 18 out through the collectors 20 and up through the filter medium 19 into the waste discharge chamber 58, dirt and debris being carried out with it. Prior to resuming the normal filtration position handle 84 is operated to register the arrow 106 with "rinse". This arrangement of ports is shown in FIG. 6. As there shown, incoming pressurized water is passed through chamber 56 and port 81, thence through the filter bed and returned up pipe 18, thence out through port 82 and waste discharge chamber 58 and line 27 so that the pool is not contaminated with backwash water remaining in the filter media 19.

We claim:

1. For use with a swimming pool water filter comprising a vessel containing a water filtering medium for filtering water under pressure, a valve structure comprising (a) a hollow body having multiple flow apertures,
   (b) a rotary plate on the body and having flow porting, the plate being movable toward and away from said flow apertures,
   (c) seal means between the body and plate,
   (d) a handle to rotate said plate to bring said plate porting into and out of selected registration with flow apertures,
   (e) the handle having alternate first and second positions, the handle first position being inverted relative to the handle second position, and means mounting the handle to pivot without rotating the plate, and between said first position in which the handle has moved the plate to energize the seal means to seal off between the body and plate, and said second position in which the handle has moved the plate to de-energize said seal means whereby the plate may then be rotated, said means mounting the handle including a handle connection to said body defining a handle pivot axis, and a handle connection to the plate defining a second axis, said pivot axis and said second axis being eccentrically located relative to one another, the handle connection to the plate including a shaft projecting from the plate normal to said second axis, and a fastener interconnecting the shaft and handle and defining said second axis, the shaft defining a shaft axis about which the plate is rotatable,
   (f) the handle having a curved generally non-circular cam surface to engage the body in said handle first position to frictionally lock the handle in said position, said second axis located at different distances from different portions of said curved cam surface, said second axis located further from said plate than said handle pivot axis in said handle first position, and said second axis located closer to said plate than said handle pivot axis in said handle second position, the handle extending away from said pivot axis and in one direction generally normal to said shaft axis in said first position, and the handle swung to extend away from said pivot axis generally oppositely to said one direction and generally normal to said shaft axis in said handle second position.

2. The structure of claim 1 wherein said handle connection to the body includes a forked handle portion defining flanges, and trunnions on the flanges received in bearing recesses in mounting structure on the body, said recesses elongated in a direction normal to said handle pivot axis which is parallel to the second axis.

3. The valve structure of claim 1 wherein there are at least three of said multiple flow apertures, and the plate has two flow ports variably registrable with said at least three flow apertures, and said seal means includes inner and outer seal rings and spokes interconnecting the rings to define bounded regions respectively in registration with said at least three flow apertures.

4. The valve structure of claim 3 wherein said seal rings and spokes are compressed by said plate in said handle first position.

5. The valve structure of claim 1 including said swimming pool filter.

6. The valve structure of claim 1 in combination with said filter, the plate having three selectable and rotatably spaced plate positions when the plate is moved relatively away from the body, and rotated by the handle, said valve structure and filter cooperating in said three plate positions to respectively provide:
  (i) filter operation
  (ii) backwash operation
  (iii) rinse operation.

7. In combination with a swimming pool water filter comprising a vessel containing a water filtering medium and adapted for filtering water under pressure, a valve structure comprising
  (a) a hollow body having multiple flow apertures which open vertically,
  (b) a rotary plate under said body and having flow porting, the plate being movable vertically toward and away from said flow apertures,
  (c) seal means between the body and plate,
  (d) a handle having operative connection to the plate to rotate said plate about a vertical axis to bring said plate porting into and out of selected vertical registration with said flow apertures, said operative connection including a pin connection to a shaft, the pin having a pin axis,
  (e) the handle having alternate first and second positions, the handle first position being inverted relative to the handle second position,
and means mounting the handle to pivot about a second axis without rotating the plate, and between said first position in which the handle has moved the plate to energize the seal means to seal off between the body and plate, and said second position in which the handle has moved the plate to de-energize said seal means, said pin axis located further from said plate then said second axis in said handle first position, and said pin axis located closer to said plate than said second axis in said handle second position, the handle extending away from said vertical axis and in one direction generally normal to said vertical axis in said first position, and the handle swung to extend away from said vertical axis generally oppositely to said one direction and generally normal to said vertical axis in said handle second position.

8. The valve structure of claim 7 wherein there are at least three of said multiple flow apertures, and the plate has two flow ports variably registrable with said at least three flow apertures, and said seal means includes inner and outer seal rings and spokes interconnecting the rings to define bounded regions respectively in registration with said at least three flow apertures.

9. The valve structure of claim 8 wherein said seal rings and spokes are compressed be said plate in said handle first position.

10. For use in a swimming pool water filter comprising a vessel containing a water filtering medium and adapted for filtering water under pressure, a valve structure comprising
  (a) a hollow body having multiple flow apertures,
  (b) a rotary plate on the body and having flow porting, the plate being movable toward and away from said flow apertures,
  (c) seal means between the body and plate,
  (d) a handle having operative connection to the plate to rotate said plate to bring said plate porting into and out of selected registration with said flow apertures,
  (e) the handle having alternate first and second positions, the handle first position being inverted relative to the handle second position, and means mounting the handle to pivot without rotating the plate, and between said first position in which the handle has moved the plate to energize the seal means to seal off between the body and plate, and said second position in which the handle has moved the plate to de-energize said seal means whereby the plate may then be rotated, said means mounting the handle including a handle connection to said body defining a handle pivot axis, the handle connection to the plate including a shaft projecting from the plate, the shaft defining a shaft axis about which the plate is rotatable,
  (f) the handle extending away from said pivot axis and in one direction generally normal to said shaft axis in said first position, and the handle swung to extend away from said pivot axis generally oppositely to said one direction and generally normal to said shaft axis in said handle second position.

* * * * *

UNITED STATES PATENT AND TRADEMARK OFFICE
CERTIFICATE OF CORRECTION

PATENT NO. : 4,869,817
DATED : September 26, 1989
INVENTOR(S) : Joe MENDOZA et al.

It is certified that error appears in the above-identified patent and that said Letters Patent is hereby corrected as shown below:

In the SUMMARY OF THE INVENTION:

Column 1, line 44 - the period (.) should be a colon (:);

In the DETAILED DESCRIPTION:

Column 3, line 33 - "ar" should be "are";

Signed and Sealed this

Twenty-fifth Day of September, 1990

Attest:

HARRY F. MANBECK, JR.

*Attesting Officer*  *Commissioner of Patents and Trademarks*